United States Patent [19]

Frederiksen

[11] 3,778,557

[45] Dec. 11, 1973

[54] ENCODER

[75] Inventor: Jeffrey E. Frederiksen, Milwaukee, Wis.

[73] Assignee: Post Corporation, Appleton, Wis.

[22] Filed: Mar. 22, 1972

[21] Appl. No.: 237,156

[52] U.S. Cl. .............................................. 179/90 K
[51] Int. Cl. .............................................. H04m 1/26
[58] Field of Search ....................... 179/84 VF, 90 B, 179/90 K; 340/365

[56] References Cited

UNITED STATES PATENTS 3,538,256 11/1970 Lucas ................................ 179/90 K
3,538,263 11/1970 Midis ................................ 179/90 B

*Primary Examiner*—Ralph D. Blakeslee
*Attorney*—Fred Wiviott et al.

[57] ABSTRACT

A programmable binary frequency dividing circuit is connected to an oscillator for providing predetermined number of frequency signals. The first and second plurality of logic gates are each coupled to the frequency divider for receiving preselected ones of the frequency signals and for providing output tones having a frequency dependent upon the relationship of the frequency signals received. Switching means sequentially provide output tones from selected pairs of the logic gates.

32 Claims, 2 Drawing Figures

ENCODER

BACKGROUND OF THE INVENTION

It is common practice to employ encoders capable of providing various code signals for transmission to remote receivers. Such signals may be employed, for example, to ring telephones or to actuate remote apparatus. Because each such encoder is generally linked to a plurality of remote receivers, it is the general practice to send out a code signal which will actuate a particular remote receiver. In prior art apparatus for performing this function, it was generally necessary to actuate an individual code switch for each code signal to be transmitted. In addition, prior art systems required complicated circuitry for the generation of a plurality of tone signals. Such prior art systems were bulky and expensive. Many prior art systems were also subject to radio frequency interference.

SUMMARY OF THE INVENTION

A general object of the invention is to provide a new and improved signal encoder.

Another object of the invention is to provide an encoder capable of providing a plurality of sequential tones and which is compact and economical.

A further object of the invention is to provide an encoder operable to sequentially provide a plurality of tone signals upon the actuation of a single switching device.

Yet another object of the invention is to provide a sequential tone generator which is not subject to radio frequency interference.

A further object of the invention is to provide a programmable encoder in which preselected audible tones of a large number of tone signals may be generated.

These and other objects and advantages of the instant invention will become apparent from the detailed description thereof taken with the accompanying drawings.

DESCRIPTION OF THE PREFERRED EMBODIMENT

Figure 1:
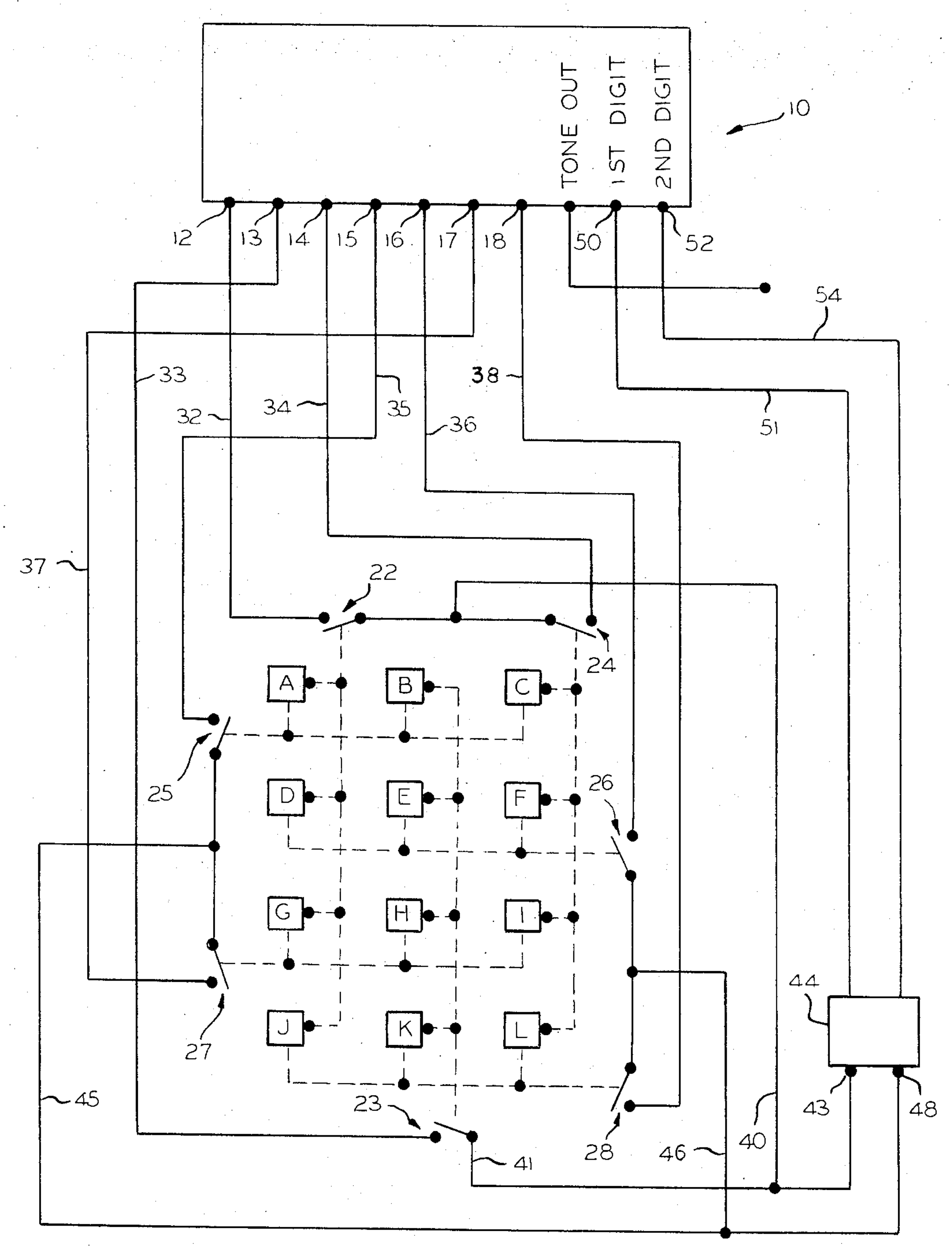
FIG. 1 is a schematic representation of the encoder according to the instant invention.

FIG. 1 shows the encoder according to the preferred embodiment of the invention to include a tone generator 10 and a matrix switch 11. As will be discussed more fully below, the tone generator 10 includes a plurality of terminals 12, 13, 14, 15, 16, 17 and 18 at which appear signals having predetermined different programmed frequencies.

The switching matrix includes switches 22, 23, 24, 25, 26, 27 and 28 which are respectively connected to terminals 12, 13, 14, 15, 16, 17 and 18 through corresponding conductors 32, 33, 34, 35, 36, 37 and 38. In addition, the switching matrix includes a plurality of push buttons identified by the letters A, B, C, D, E, F, G, H, I, J, K and L which are arranged in four rows and three columns with each row and column being coupled to one of the switches 22–28. More specifically, switch 22 is coupled to be closed by each of the push buttons A, D, G and J in column one; switch 23 by each push button B, E, H and K in column two; switch 24 by each of push buttons E, F, I and L in column three; switch 25 by each of push buttons A, B and C in row one; switch 26 by each of push buttons D, E and F in row two; switch 27 by push buttons G, H and I in row three; and switch 28 by each of push buttons J, K and L in row four. It can thus be seen that each of the push buttons is operative to close a pair of the switches 22–28.

Conductors 40 and 41 connect column switches 22, 23 and 24 to terminal 43 of switching circuit 44 and conductors 45 and 46 connect row switches 25, 26, 27 and 28 to terminal 48 of circuit 44. As will be pointed out more specifically below, circuit 44 is operable upon the closing of any one of the push buttons, A-L to connect one of the tone generator terminals 12, 13 or 14 to one of the column switches 22, 23 or 24 and one of the tone generator terminals 15, 16, 17 or 18 to one of the row switches 25, 26, 27 or 28. In this manner, a pair of tone signals can be transmitted upon the actuation of any one of the push buttons A-L. As will also be described more fully below, switching circuit 44 is operative to control the sequence of tone signals upon the actuation of any of the push buttons A-L. Toward this end, switching circuit 44 has a first condition wherein terminal 43 is connected to the first digit terminal 50 of tone generator 10 through conductor 51 and terminal 48 is connected to the second digit terminal 52 through conductor 54. In this condition, the column tone will be transmitted first and the row tone transmitted second. Switching circuit 44 in addition has an alternate condition wherein the row tone will be transmitted first and the column tone second.

Figure 2:
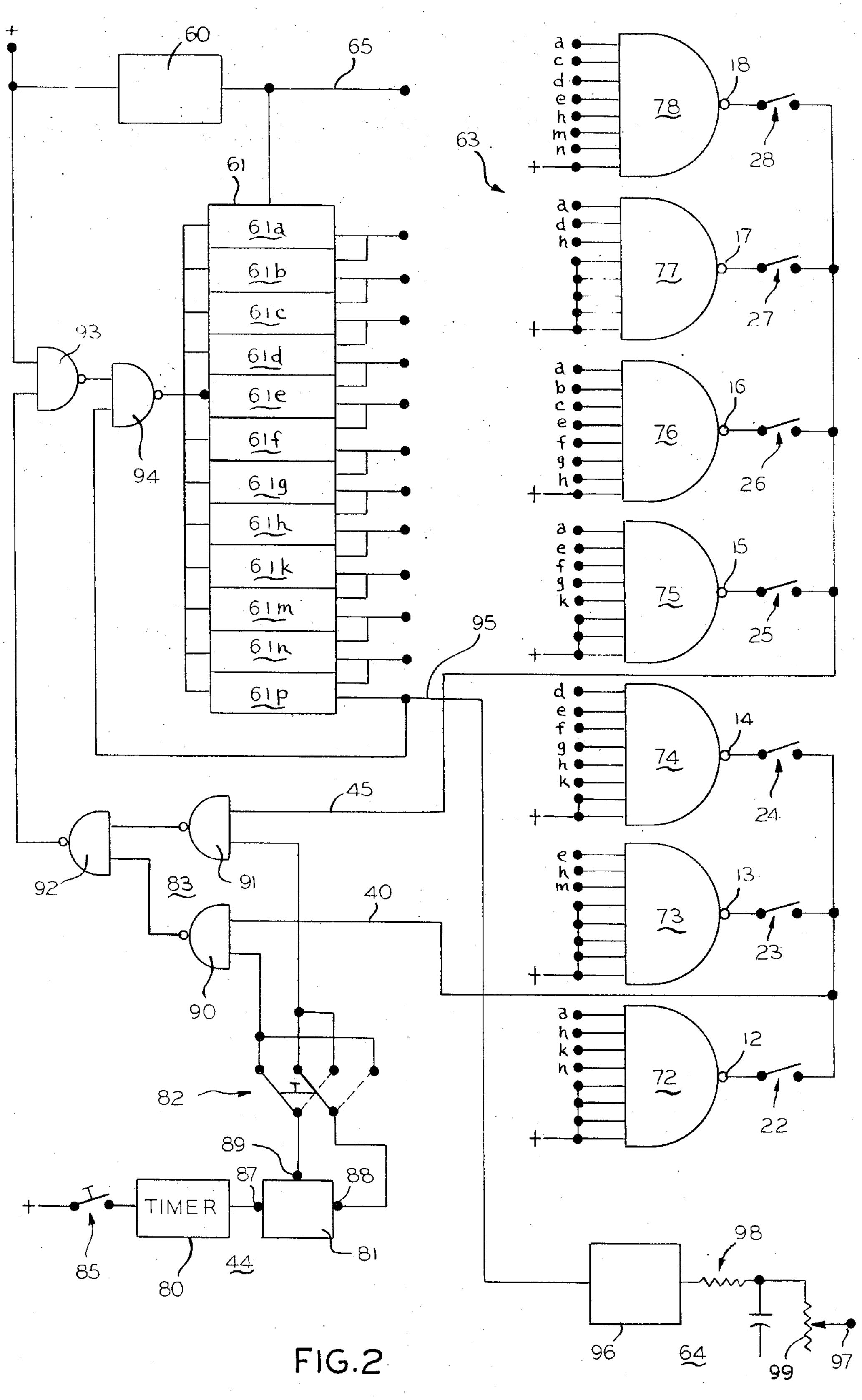
FIG. 2 is a schematic representation of the tone generator of the encoder illustrated in FIG. 1.

Referring now to FIG. 2, the tone generator 10 is shown to include a clock oscillator 60, frequency dividing circuitry 61, a tone signal circuit 63, and output circuit 64.

The clock oscillator 60 may be of any conventional well-known type such as a crystal controlled oscillator or clock which may be constructed and arranged to provide any desired frequency. For example, in one embodiment of the invention, the clock 60 was adjusted to provide 4096KHz. The output terminal of the clock 60 is coupled to the frequency divided circuitry 61 which includes a plurality of serially connected frequency divided circuits 61*a*, 61*b*, 61*c*, 61*d*, 61*e*, 61*f*, 61*g*, 61*h*, 61*k*, 61*m*, 61*n* and 61*p*. Each of the frequency dividing circuits 61*a*–61*p* are constructed and arranged to divide by two the frequency of the preceeding circuitry and to provide the same on its respective output terminal. Thus, if the frequency at the output 65 of clock 60 is 4096KHz, the frequencies appearing on the output terminals of the frequency dividing circuits are as follows: 61*a*—2048KHz; 61*b*—1,024KHz; 61*c*—512KHz . . . 61*n*—2KHz; and 61*p*—1KHz.

The frequency dividing circuit 61 may comprise any well known system, such as a series of flip-flop circuits 61*a*–61*p* interconnected as a binary counter. As those skilled in the art will appreciate, the frequency appearing at the output terminal of each successive element in the counting chain will be half that of the input pulse signal which in the case of the first element of 61*a* will be the clock pulse and which in the case of each succeeding element will be the output pulse from the previous element.

The tone signal circuit 63 includes seven gate circuit units arranged in two groups. The first group represents the three columns and includes gates 72, 73 and 74 which are respectively coupled through terminals 12, 13, and 14 to switches 22, 23 and 24. The second group of gate circuit units represents the four rows and includes gates 75, 76, 77 and 78 which are respectively coupled through terminals 15, 16, 17 and 18 to switches 25, 26, 27 and 28. Each of gates 72–78 may comprise any logic gate but preferably, are AND gates which include a plurality of input terminals adapted to be connected to preselected ones of the terminals of frequency dividing circuits 61*a*–61*p*. The terminal combination of the frequency dividing circuits 61*a*–61*p* to which the input terminals of each of the AND gates 72–78 are coupled determines the tone which appears on the respective terminal 12–18 of each. For example, the terminals of gates 72–78 may be connected to the terminals of the frequency dividing circuit 61 as shown in FIG. 2 which provides the following frequency of each gate:

| Gate | *f* |
|---|---|
| 72 | 592.5Hz |
| 73 | 757.5Hz |
| 74 | 802.5Hz |
| 75 | 847.5Hz |
| 76 | 892.5Hz |
| 77 | 937.5Hz |
| 78 | 547.5Hz |

It will be appreciated that a large number of other combinations of tone signals may be provided by varying the connections as between the input terminals of the gates 72–78 and the terminals of the frequency dividing circuit 61. in this manner, the system can be programmed to provide various ones of a large number of possible tone signal combinations. In addition, each of the preset ones of the tone signals can be modified merely by changing one or more terminal connections.

The switching circuit 44 is shown to include a timer 80, a Schmitt trigger circuit 81, a selection switch 82 and a tone signal selection gate circuit 83. Operation of the switching circuit 44 may be initiated in any conventional manner such as by a switch 85 which may be interlocked with the push buttons A-L. The timer 80 may be of any conventional type designed to provide a first signal to terminal 87 of Schmitt trigger circuit 81 upon the closing of switch 85 and to provide a second signal thereto after a predetermined time delay. As those skilled in the art will appreciate, the Schmitt trigger circuit 81 is operative to provide an output signal from a first terminal 88 when a signal above a predetermined magnitude appears on its input terminal 87 and an output signal from the second terminal 89 when a signal below a predetermined magnitude appears at input terminal 87.

The selector switch 82 couples the Schmitt trigger circuit 81 to the tone signal selection gate circuit 83 which includes gates 90, 91 and 92. Switch 82 has a first position shown by full lines in FIG. 2 wherein terminal 89 of Schmitt trigger circuit 81 is coupled to a first terminal of gate 90 and terminal 88 of circuit 81 is coupled to a first terminal of gate 91. Selector switch 82 also has an alternate position shown by dashed lines in FIG. 2 wherein terminal 89 of circuit 81 is coupled to gate 91 and terminal 88 is coupled to gate 90. The other terminals of gates 90 and 91 are respectively coupled to conductor 40 which is common to the column switches 22, 23 and 24 and conductor 45 which is common to the row switches 25, 26, 27 and 28. The output terminals of gates 90 and 91 are connected to gate 92 which in turn is coupled to the input terminal of the inverter connected gate 93 and the other terminal of which is disabled by coupling to a voltage source. A second reset gate 94 is coupled to the inverter 93 and to the last terminal 61p of the frequency dividing circuit 61.

As discussed above, when one of the push buttons A-L are depressed, the row and column switch coupled thereto will be closed. For example, assume push button E is depressed closing column switch 23 and row switch 26. This couples gates 73 and 76 to gates 91 and 90 respectively and closes timer switch 85. A first signal will be provided to terminal 87 of Schmitt trigger circuit 81 to provide an output signal at terminal 88. This will enable gate 91 which in turn enables gate 92 and inverter 93 to couple column switch 23 to gate 94 which is enabled when the frequency dividing circuit or counter 61 counts down to the last circuit 61p. When gate 94 is enabled, a reset signal will be provided to the frequency dividing circuit 61 and a first tone signal associated with row switch 26 and gate 76 will appear on conductor 95 connected between terminals 61p and the output circuit 64.

After a predetermined time delay, timer 80 will operate to provide a second signal to terminal 87 of Schmitt trigger circuit 81 whereby signal will appear at terminal 89 to enable gate 90 while the signal at gate 88 will terminate to disable gate 91. This couples the column switch 23 to reset gate 94 through gates 90 and 92 and inverter 93 whereby the tone signal associated with switch 23 and gate 73 will appear at the conductor 95. In this manner, the two signals will be sequentially provided to the output of the system when any one of the push buttons A-L are depressed. While in the illustrated example the row tone signal will be transmitted first as a result of the position of selector switch 82, the sequence of tone signals can be reversed by moving switch 82 to its alternate position.

The output circuit 64 may include a JK flip-flop circuit 96 coupled to conductor 95 and to an output terminal 97 through a low pass filter 98 and a volume control 99.

Those skilled in the art will appreciate that while the illustrated apparatus is constructed and arranged to provide two sequential tone signals, three or more tone signals can be transmitted by connecting additional tone gates to the push buttons A-L. In addition, the switching circuit 44 would be required to provide three or more tone initiating signals. This could be accomplished in any convenient manner such as the duplication of timer 80 and the Schmitt trigger circuit 81 plus additional poles to the selector switch 82 and additional gates to the tone selection gate circuit 83.

The tone signals may be transmitted through any convenient medium such as telephone wires, radio, or any wire system.

The system according to the invention is capable of providing a wide range of frequency signals without a complicated circuitry and with a flexibility which permits the modification of tone signals with simple rewiring. Further, the system, according to the invention, is economical, accurate, and is not subject to radio frequency interference. In addition, the system is compact and may easily be placed within an ordinary telephone casing.

While only a single embodiment of the invention has been shown and described, it is not intended to be limited thereby but only by the scope of the appended claims.

I claim:

1. An encoder comprising first means for generating a continuous sequence of signals having a constant period, a plurality of second counting means each coupled to receive said signals and each operative to provide a binary signal coincident with each counting means counting a predetermined and unique number of said period signals during a time interval, third means actuated by receiving said binary signals simultaneously from at least a pair of said second means to produce output signals having a period substantially equal to the time interval represented by the total number of counts and said output signal constituting a tone signal, output circuit means, and switching circuit means for sequentially coupling said pair of actuated third means to said output circuit means to sequentially transmit said tone signals.

2. The combination set forth in claim 1 wherein said first means comprises an oscillating circuit means and said second counting means comprises a plurality of serially connected frequency dividing means which respectively actuate the next consecutive dividing means to count in response to the preceding means making a predetermined number of counts.

3. The combination set forth in claim 1 wherein said third means comprises a plurality of gate circuit means each having a plurality of input terminals, certain of said input terminals being connected to receive preselected ones of the binary signals.

4. The combination set forth in claim 3 wherein said gate circuit means comprises AND gate circuit means.

5. The combination set forth in claim 3 and including switch means associated with each of the gate circuit means and a plurality of push button means each interconnected with at least a pair of said switch means for actuating the same to initiate at least a pair of tone signals.

6. The combination set forth in claim 3 wherein switching circuit means includes sequencing gate means connected to a different one of said pair of actuated third means and circuit means for sequentially providing enabling signals to said gate means.

7. The combination set forth in claim 6 and including reversing switch means connected between said pair of actuated gate circuit means and said sequencing gate means for reversing the sequence of said enabling signals to said gate circuit means.

8. The combination set forth in claim 6 wherein said plurality of third means are arranged in at least two groups, each of said push button means being operative to actuate at least one push switch means in each group.

9. The combination set forth in claim 8 wherein said switching circuit means includes at least a pair of sequencing gate means, each of said sequencing gate means being connected to each of the switch means in one of said groups and circuit means for sequentially providing enabling signals to said gate means.

10. The combination set forth in claim 9 and including reversing switch means connected between said pair of actuated third means and said gate means for reversing the sequence of said enabling signals to said gate circuit means.

11. The combination set forth in claim 10 wherein said first means comprises a clock oscillator and said second means comprises a binary counter having a plurality of elements, preselected ones of the input terminals of each gate circuit means being connected to receive preselected ones of the elements of said binary counter.

12. The combination set forth in claim 11 wherein said gate circuit means comprises AND gate circuit means.

13. The combination set forth in claim 1 and including switch means associated with each of the third means and a plurality of push button means each interconnected with at least a pair of said switch means for actuating the same to initiate at least a pair of tone signals.

14. The combination set forth in claim 13 wherein said plurality of third means are arranged in at least two groups, each of said push button means being operative to actuate at least one push switch means in each group.

15. The combination set forth in claim 14 wherein said switching means includes at least a pair of sequencing gate means, each of said gate means being connected to each of the switch means in one of said groups and circuit means for sequentially providing enabling signals to said gate means.

16. The combination set forth in claim 15 and including reversing switch means connected between said pair of actuated gate circuit means for reversing the sequence of said enabling signals to said gate circuit means.

17. The combination set forth in claim 1 wherein said switching circuit means includes sequencing gate means connected to a different one of said pair of actuated second means and circuit means for sequentially providing enabling signals to said gate means.

18. The combination set forth in claim 17 and including reversing switch means connected between said pair of actuated second means and said sequencing gate means for reversing the sequence of said enabling signals to said gate circuit means.

19. A tone generator comprising first means for generating time signals, a plurality of summing means each coupled to receive signals representative of predetermined numbers of said time signals and each operative to provide a tone signal pulse when said representative signals have a predetermined relation, switching means connected with the summing means, respectively, to permit selecting a tone signal from at least one of said summing means, and means responsive to occurrence of a tone signal by resetting said counting means.

20. The combination set forth in claim 19 wherein said summing means comprises a plurality of gate circuit means each having a plurality of input terminals, certain of said input terminals being connected to receive preselected ones of the time representative signals.

21. The combination set forth in claim 20 wherein said gate circuit means comprises AND gate circuit means.

22. The combination set forth in claim 21 wherein said first means comprises an oscillating circuit means and a plurality of serially connected frequency dividing means.

23. The combination set forth in claim 22 wherein said oscillating circuit means comprises a clock oscillator and said frequency dividing means comprises a binary counter having a plurality of elements.

24. Means for generating a tone signal comprising:

a. first means for producing electric pulses at a constant repetition rate so that selected numbers of said pulses will represent a total time interval, b. a second plurality of pulse counting means receiving said pulses and each counting means being constructed and arranged to count a certain number of pulses and to produce a characteristic signal when said number is reached, at least some of said counting means counting different numbers than the others to thereby represent different time increments of said total time interval, c. third means coupled with each of said counting means, said third means being responsive to simultaneously receiving said characteristic signals by producing an output signal and repeating the same each time said simultaneous signals are received, said output signals constituting a tone comprised of signals occurring with a period corresponding in time with the total number of pulses counted in an interval.

25. The signal generator set forth in claim 24 including:

a. a plurality of said third means each of which are responsive to different combinations of said characteristic signals to provide tone signals, respectively, having different frequencies.

26. The invention set forth in claim 25 including:

a. output circuit means, and b. switching means for sequentially coupling output signals from said third means to said output circuit means to sequentially transmit said tone signals in consecutive pairs.

27. The invention set forth in claim 24 wherein:

a. said third means comprise a plurality of gate means each having a plurality of input terminals, certain of said input terminals being connected with said counting means to receive preselected ones of said characteristic signals.

28. The invention set forth in claim 27 wherein:

a. there are at least two groups of said third means and including switching means, respectively connected to at least certain of said third means to permit selection of output signals from said means, and b. means for actuating selectively at least two of said switches simultaneously whereby to permit delivery of at least two tone signals.

29. The invention set forth in claim 28 including:

a. output circuit means, b. at least a pair of gate means each of which is in circuit with said switch means and said output circuit means, c. means for sequentially operating said gate means to couple alternate signals from said selectively actuated switch means to said output circuit means.

30. The invention set forth in claim 29 including:

a. means for producing consecutive pairs of control signals at a rate corresponding with the desired repetition rate of said tone signals, b. reversing switch means coupling said last named signal producing means to said last named gate means, said control signals alternatingly operating said gate means to transmit said tone signals in close succession to said output circuit means, said reversing switch means being operable to change the sequence of said control signals to thereby change the sequence of said tone signals.

31. The invention set forth in claim 24 including:

a. means responsive to an output signal from said third means to reset said counting means.

32. Means for producing a signal having a predetermined frequency, comprising:

a. first means for generating pulses at a constant repetition rate, b. a plurality of means for receiving and counting said pulses, each of said counting means having an output terminal and being constructed and arranged to repeatedly produce a predetermined time representative signal thereon in response to the associated counting means counting a predetermined number of pulses, c. summing means coupled with said counting means and actuated by receiving said predetermined time representative signals simultaneously to produce output signals which have a period corresponding with the time interval for accumulating the total number of counts required to produce said predetermined time representative signals at said predetermined frequency, and d. means responsive to occurrence of output signals by resetting said counting means.

* * * * *